No. 12,036. Reissued Sept. 30, 1902.
J. M. DODGE.
MOVING STAIRWAY.
(Application filed July 24, 1902.)
10 Sheets—Sheet 1.
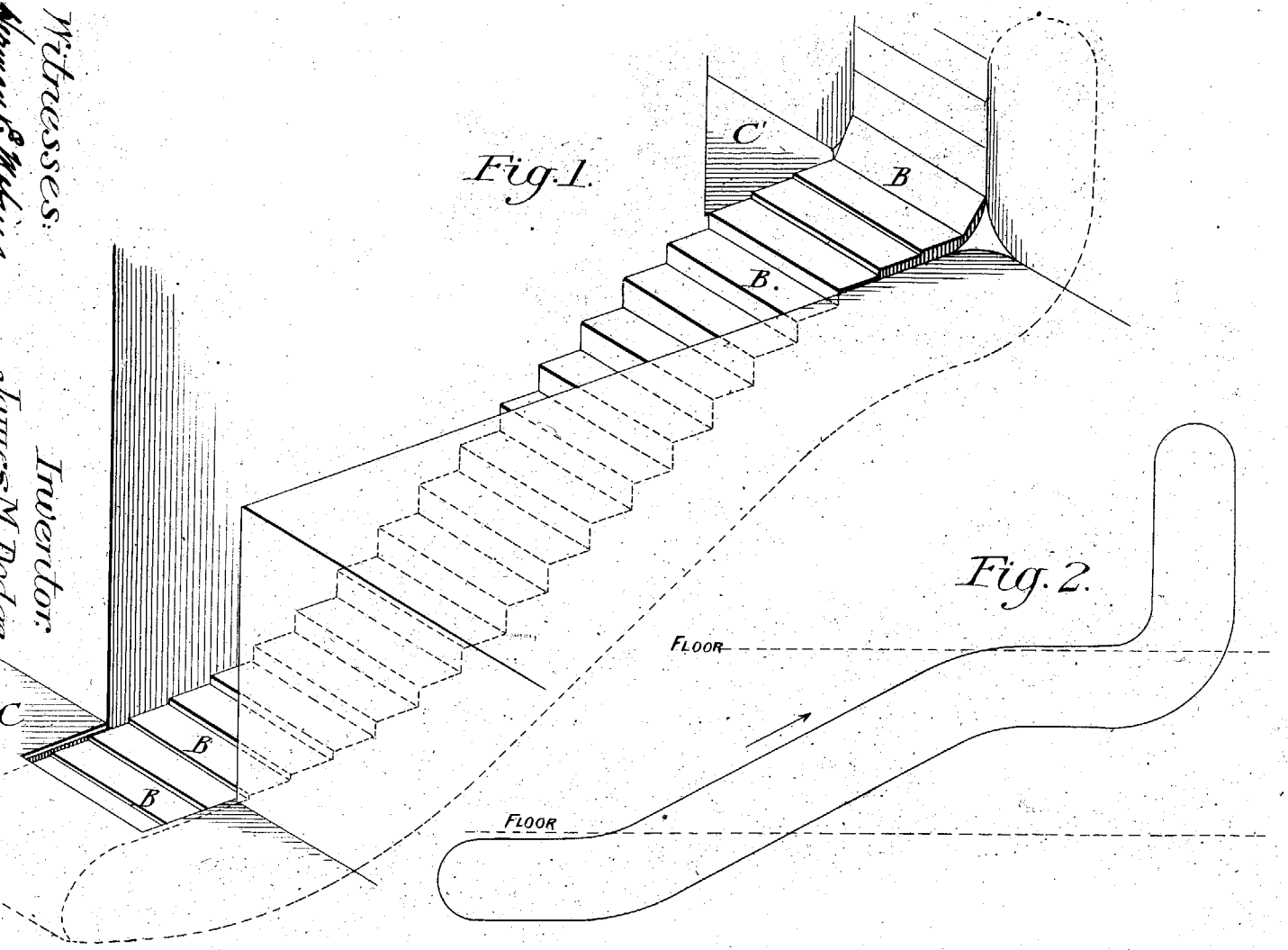
Witnesses:
Herman E. Mertes.
Frank L. A. Graham.
Inventor:
James M. Dodge,
by his Attorneys: Howson & Howson No. 12,036. Reissued Sept. 30, 1902.
J. M. DODGE.
MOVING STAIRWAY.
(Application filed July 24, 1902.)
10 Sheets—Sheet 2.
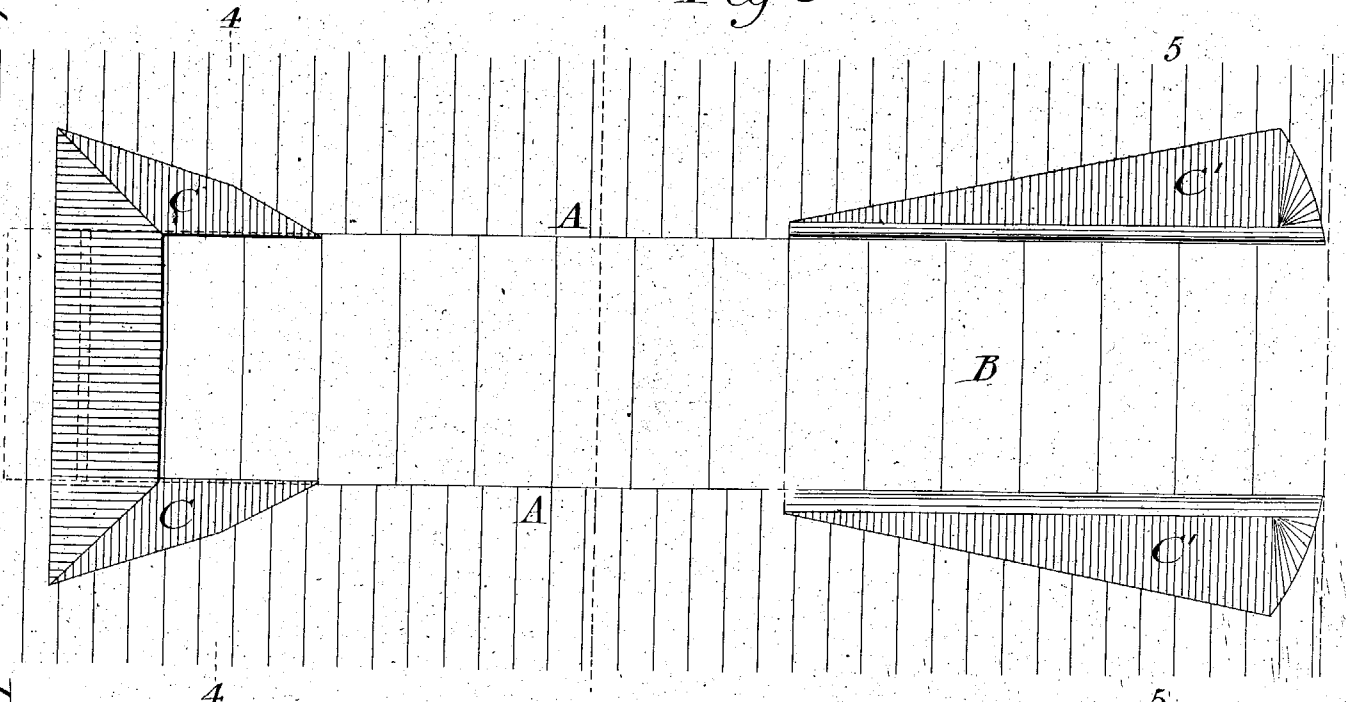
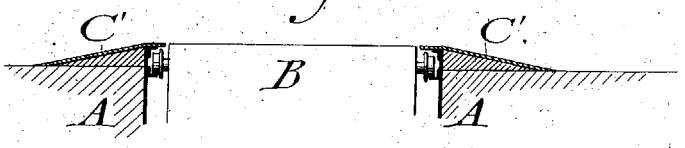
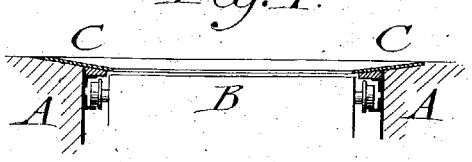
Witnesses:
Herman E. Mehus
Frank L. A. Graham
Inventor:
James M. Dodge,
by his Attorneys: Howson & Howson No. 12,036. Reissued Sept. 30, 1902.
J. M. DODGE.
MOVING STAIRWAY.
(Application filed July 24, 1902.)
10 Sheets—Sheet 3.
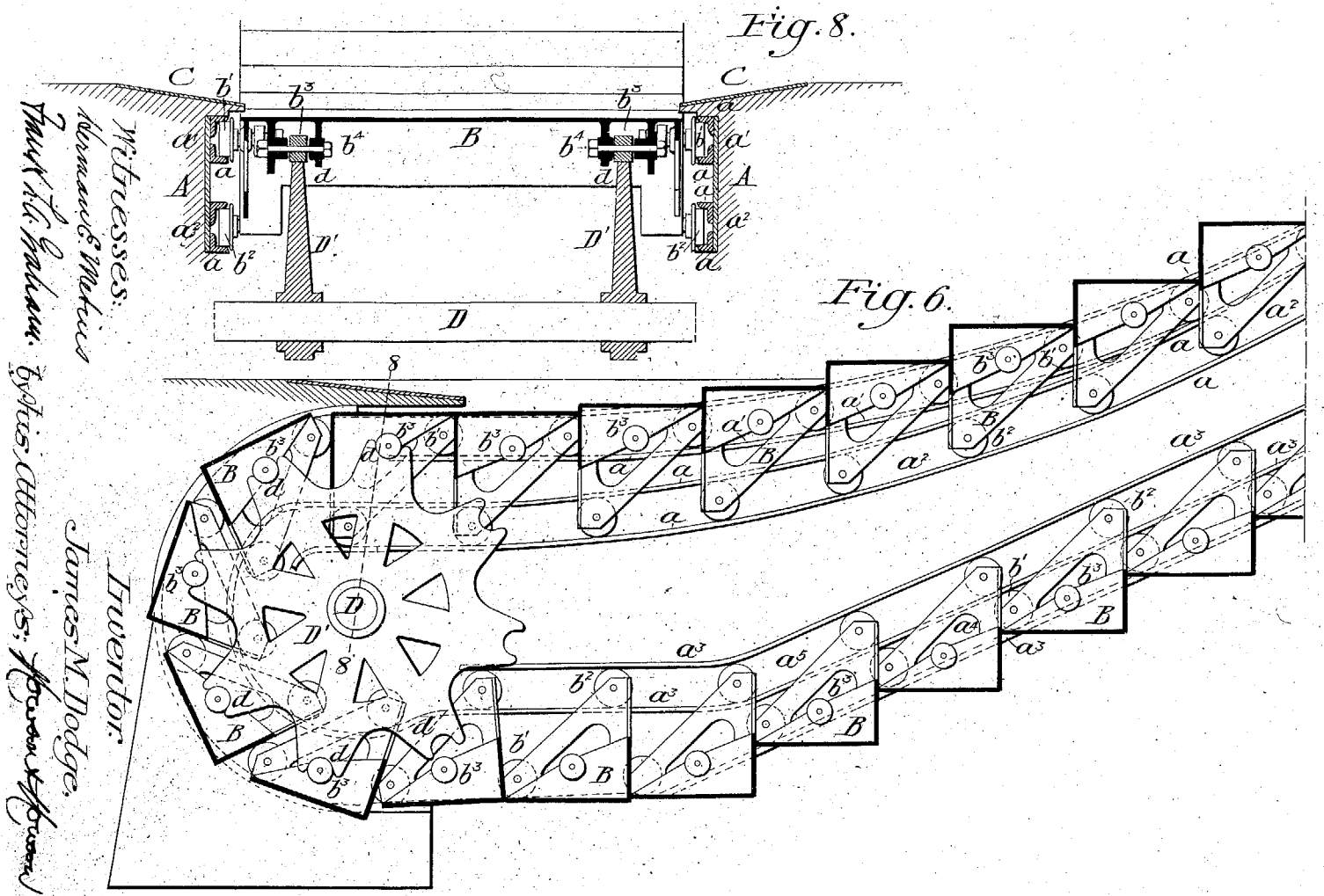
Witnesses:
Herman E. Metius
Frank L. A. Graham.
Inventor:
James M. Dodge.
by his Attorneys: Howson & Howson No. 12,036. Reissued Sept. 30, 1902.
J. M. DODGE.
MOVING STAIRWAY.
(Application filed July 24, 1902.)
10 Sheets—Sheet 4.
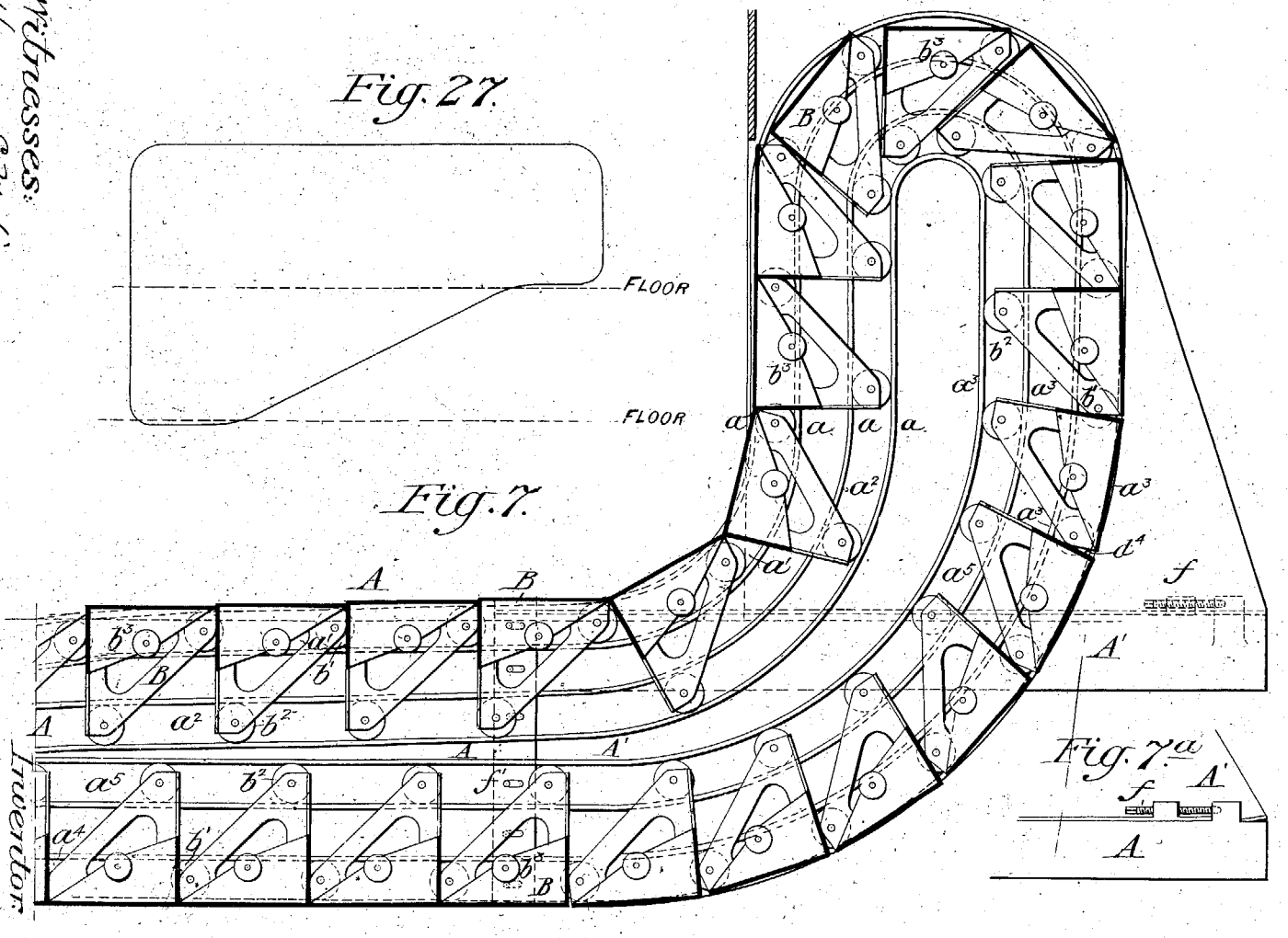
Witnesses:
Herman E. Metius.
Frank L. A. Graham.
Inventor:
James M. Dodge,
by his Attorneys: Howson & Howson No. 12,036. Reissued Sept. 30, 1902.
J. M. DODGE.
MOVING STAIRWAY.
(Application filed July 24, 1902.)
10 Sheets—Sheet 5.
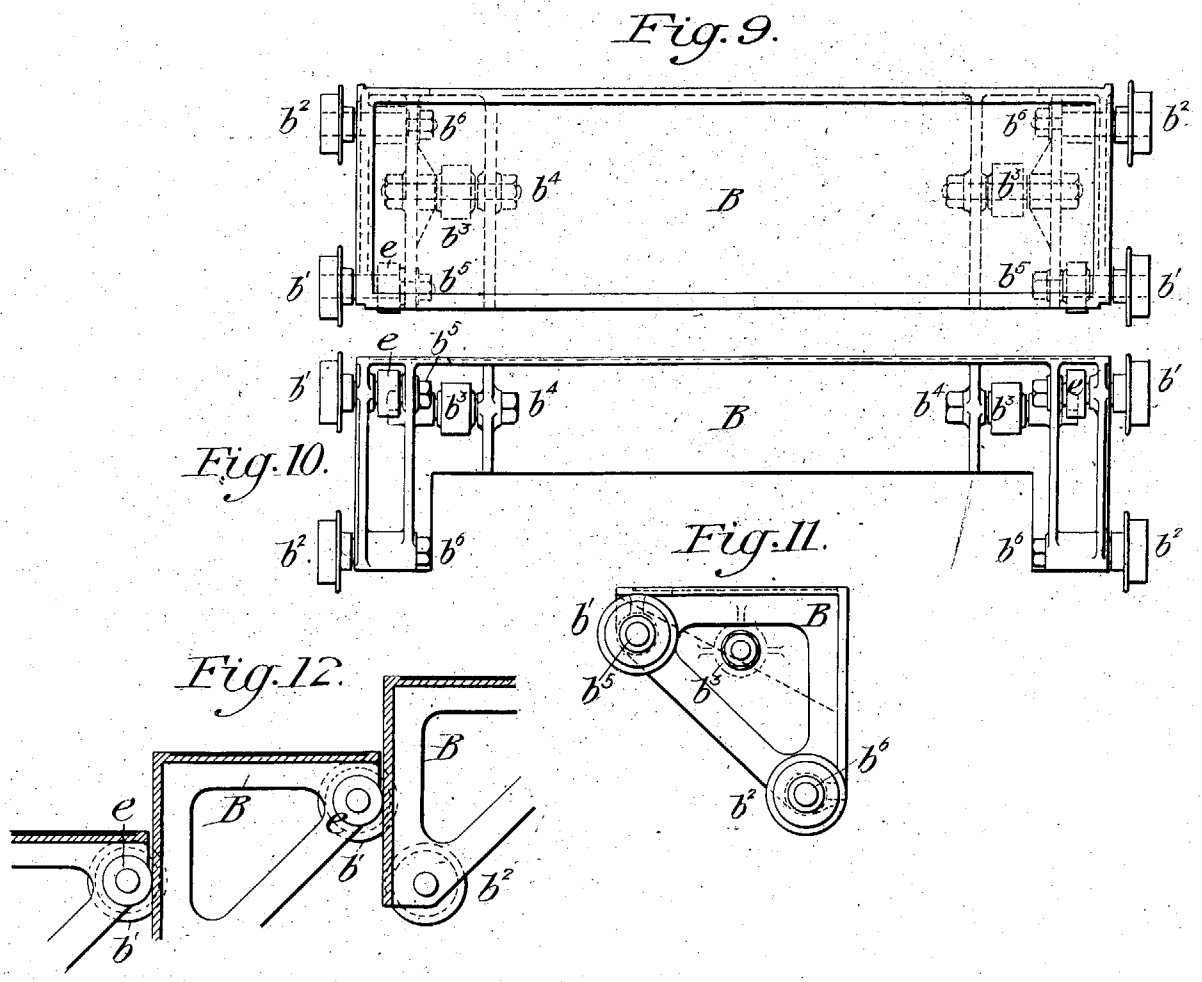
Witnesses:
Herman E. Metius
Frank L. G. Graham
Inventor:
James M. Dodge,
by his Attorneys;
Howson & Howson No. 12,036. Reissued Sept. 30, 1902.
J. M. DODGE.
MOVING STAIRWAY.
(Application filed July 24, 1902.)
10 Sheets—Sheet 6.
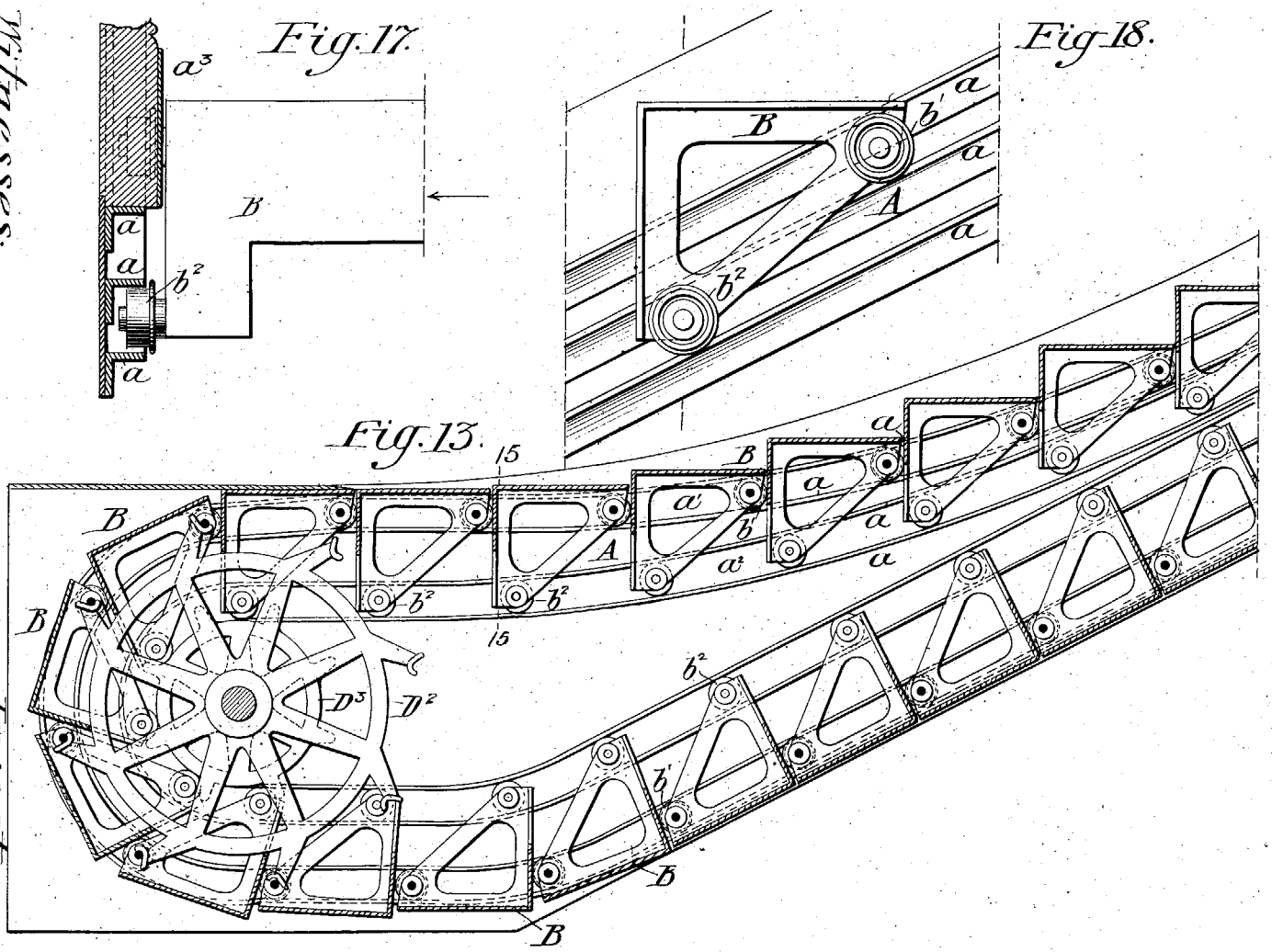
Witnesses:
Herman E. Mehus.
Frank L. G. Graham.
Inventor.
James M. Dodge,
by his Attorneys: Howson & Howson No. 12,036. Reissued Sept. 30, 1902.
J. M. DODGE.
MOVING STAIRWAY.
(Application filed July 24, 1902.)
10 Sheets—Sheet 7.
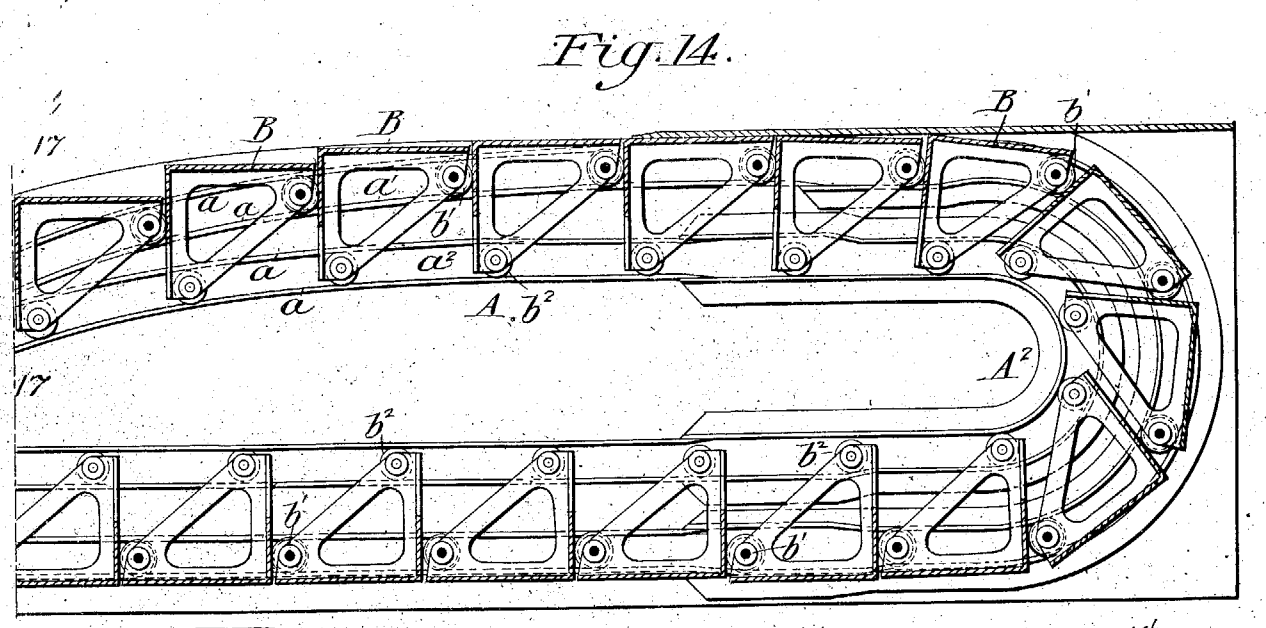
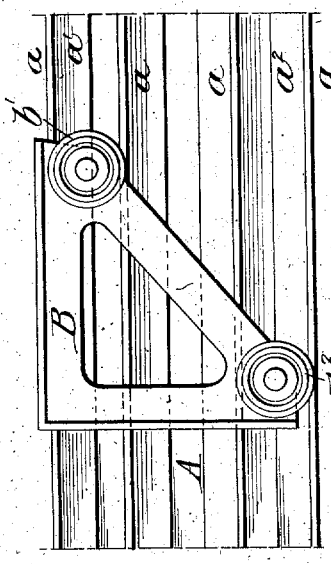
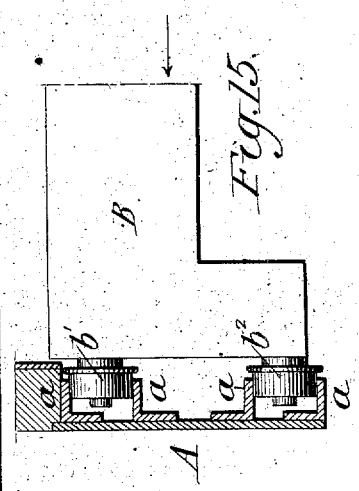
Witnesses:
Herman E. Mehrs
Frank L. A. Graham
Inventor:
James M. Dodge,
by his Attorneys:
Howson & Howson No. 12,036. Reissued Sept. 30, 1902.
J. M. DODGE.
MOVING STAIRWAY.
(Application filed July 24, 1902.)
10 Sheets—Sheet 8.
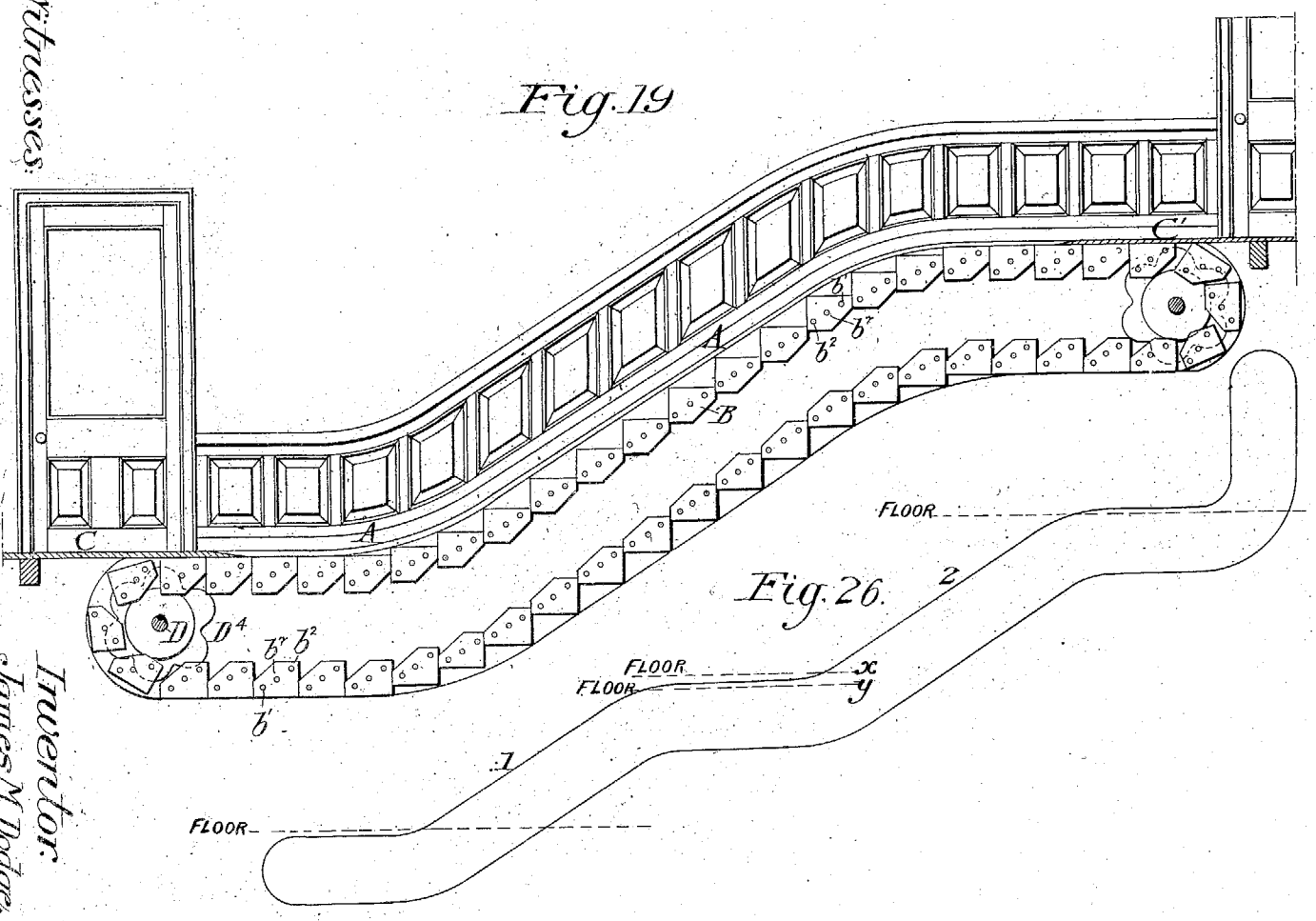
Witnesses:
Herman E. Mekins
Frank L. Graham
Inventor:
James M. Dodge,
by his Attorneys,
Howson & Howson No. 12,036. Reissued Sept. 30, 1902.
J. M. DODGE.
MOVING STAIRWAY.
(Application filed July 24, 1902.)
10 Sheets—Sheet 9
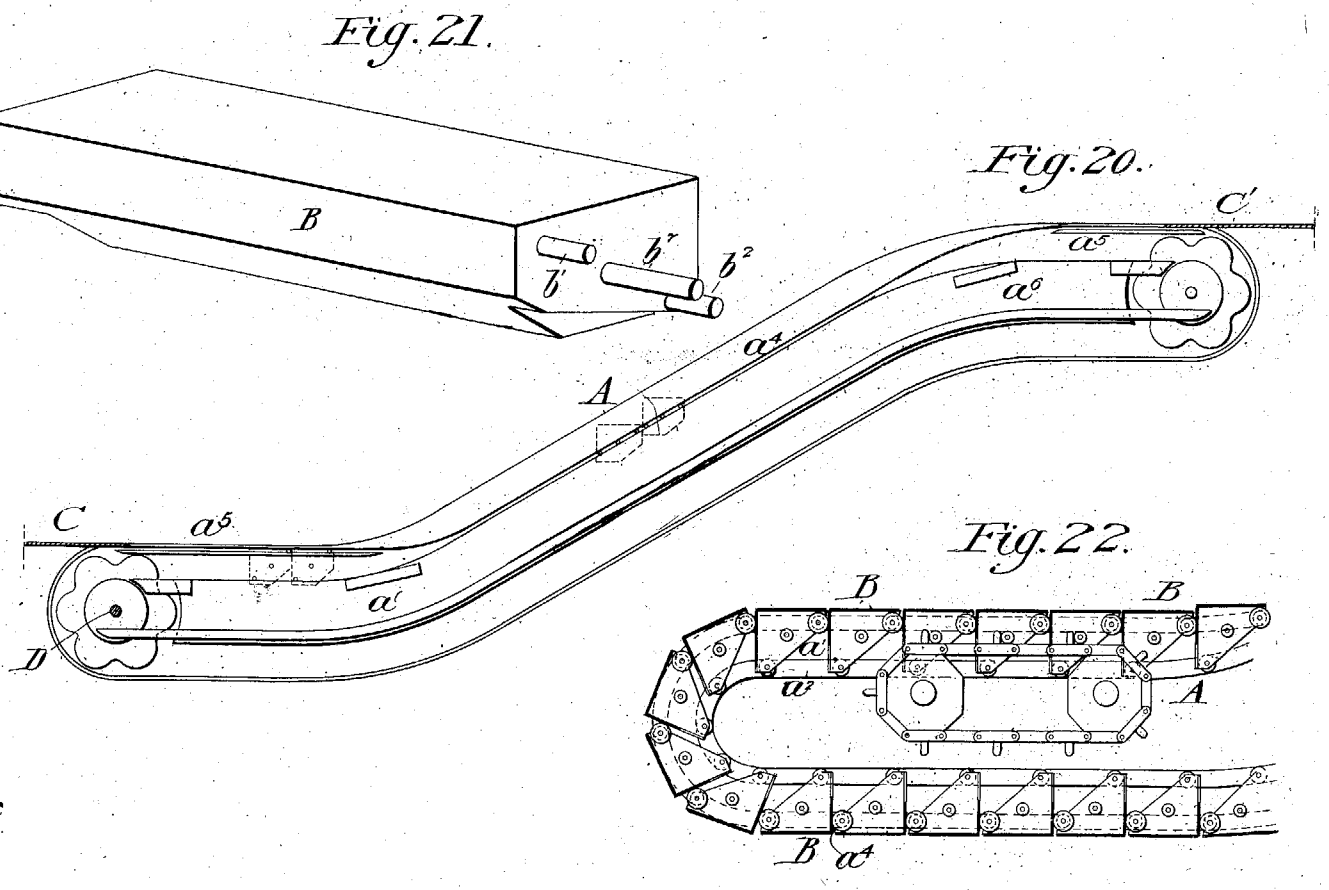
Witnesses:
Herman E. Mutius
Frank L. G. Graham.
Inventor:
James M. Dodge,
by his Attorneys;
Howson & Howson No. 12,036. Reissued Sept. 30, 1902.
J. M. DODGE.
MOVING STAIRWAY.
(Application filed July 24, 1902.)
10 Sheets—Sheet 10.
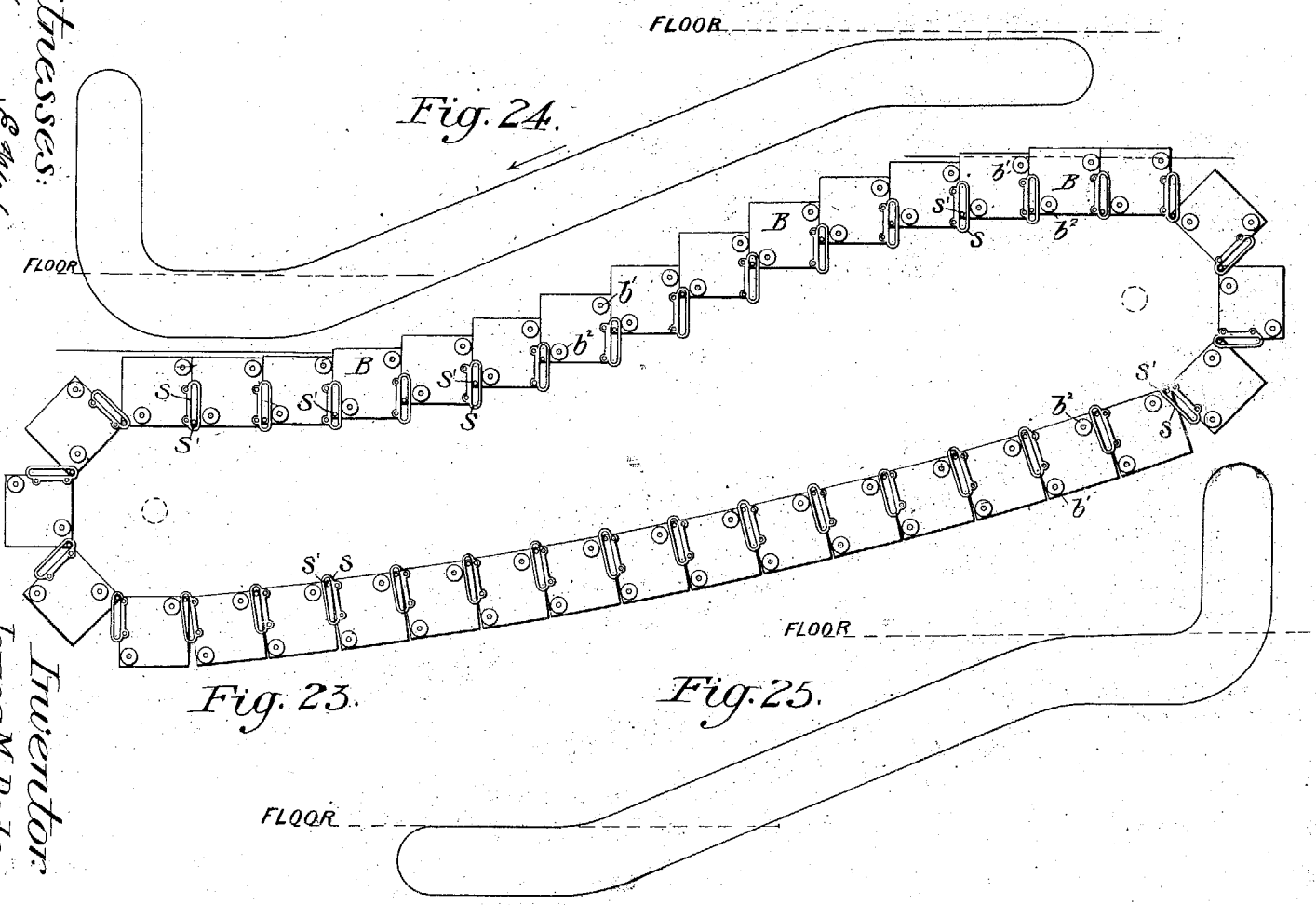
Witnesses:
Herman E. Metcus.
Frank L. A. Graham.
Inventor:
James M. Dodge,
by his Attorneys;
Howson & Howson

UNITED STATES PATENT OFFICE.

JAMES M. DODGE, OF PHILADELPHIA, PENNSYLVANIA, ASSIGNOR TO THE STAIR LIFT COMPANY, OF CAMDEN, NEW JERSEY, AND PHILADELPHIA, PENNSYLVANIA.

MOVING STAIRWAY.

SPECIFICATION forming part of Reissued Letters Patent No. 12,036, dated September 30, 1902

Original No. 598,772, dated February 8, 1898. Application for reissue filed July 24, 1902. Serial No. 116,836.

*To all whom it may concern:*

Be it known that I, JAMES M. DODGE, a citizen of the United States, residing in Philadelphia, Pennsylvania, have invented certain Improvements in Moving Stairways, of which the following is a specification.

The object of my invention is to construct a safe and convenient traveling stairway; and to this end the invention consists in so constructing and arranging the device that there are no dangerous or otherwise objectionable gaps or spaces between the steps or between the steps and the platforms or the supporting-ways, and so, also, that the height of the traveling steps gradually diminishes toward the foot and toward the top of the stairway; and the invention further consists in certain particular arrangements and combinations of parts hereinafter fully described.

In the accompanying drawings, Figure 1 is a perspective view illustrating my improvements in traveling stairways. Fig. 2 is a diagram showing the relation of the step-sections to the floors. Fig. 3 is a plan view showing the upper and lower platforms and their relation to the step-sections. Fig. 4 is a transverse section on the line 4 4, Fig. 3. Fig. 5 is a transverse section on the line 5 5, Fig. 3. Fig. 6 is a longitudinal sectional view of the lower portion of the stairway. Fig. 7 is a longitudinal sectional view of the upper portion of the stairway. Fig. 7[a] is a view of a detail of Fig. 7. Fig. 8 is a transverse sectional view on the line 8 8, Fig. 6. Fig. 9 is a plan view of one of the step-sections. Fig. 10 is a side view of one of the step-sections. Fig. 11 is an end view of one of the step-sections. Fig. 12 is a sectional view through a series of the step-sections, showing their relation one to another. Fig. 13 is a view of the lower portion of the stairway, illustrating a modification of my invention. Fig. 14 is a longitudinal sectional view of the upper portion of a stairway, illustrating a modification of my invention. Fig. 15 is a transverse sectional view on the line 15 15, Fig. 13. Fig. 16 is a view looking in the direction of the arrow, Fig. 15. Fig. 17 is a sectional view on the line 17 17, Fig. 14. Fig. 18 is a view looking in the direction of the arrow, Fig. 17. Fig. 19 is a side sectional elevation showing another modification of my invention. Fig. 20 is a view similar to Fig. 19 with the step-sections removed to show the grooves. Fig. 21 is a perspective view of one of the steps shown in Fig. 19. Fig. 22 is a sectional view showing the method of driving a series of the step-sections. Fig. 23 is a view showing a still further modification of the invention, illustrating the linking together of the series of steps, so that the sections can be returned without guides, but the linking together will allow the independent movement of the steps. Fig. 24 is a diagram view showing the mechanism illustrated in Figs. 6 and 7 constructed to run in the reverse direction. Fig. 25 is a diagram view similar to Fig. 2 with the exception that the platforms are on a level with the step-sections. Fig. 26 is a diagram view showing two flights of stairs; and Fig. 27 illustrates another modification of my invention, in which the stair-sections are returned overhead.

Prior to my invention it has been proposed to construct movable platforms and stairways by positively connecting a series of moving sections together by links, the structure constituting, in effect, an endless-chain carrier, and it has also been proposed to attach a series of steps to endless belts, making traveling stairways with which fixed platforms were to be combined. In all these prior plans, however, so far as I am aware, the movements of the traveling step-sections have been such as to cause objectionable gaps and spaces at different points and cause sudden changes in direction, as well as to develop steps of substantially the same height at the base and at the top as in the body of the stairway.

In my invention the sections constituting the traveling steps of the stairway are "independent," by which phrase as used in this description and in the accompanying claims I mean not necessarily that they are separate, although I prefer that construction, but that in the "carrying-run"—that is, while forming steps or platforms—they are not controlled by adjoining sections, thus avoiding the existence at any point in the stairway or between the stairway and the platforms of objectionable gaps or spaces, such as would be unavoidable were the sections positively connected together in a way to prevent their having independent motion. I also so construct and relatively arrange the moving step-sections and the ways in which they travel to make the traveling stairway that the steps developed at the foot and at the top of the stairway shall be of small height or depth and there shall be a gradual increase in the height of the steps upward from the foot of the stairway and downward from the top thereof, so that persons ascending or descending with the stairway shall not be required in passing onto or from the same to suddenly take a step of full height; but the conditions shall be most favorable for allowing them to adapt themselves to the conditions arising out of the travel of the steps themselves, thus minimizing danger of accident.

My invention may be used with or without a stationary or a movable hand-rail.

Referring, in the first instance, to Figs. 1 to 12, inclusive, A indicates the side plates or beams of the stairway, arranged at the proper angle, and attached in the present instance to these plates are rails $a$, Fig. 8, forming grooves $a'$ $a^2$, in which travel the wheels or shoes $b'$ $b^2$ of the step-sections B. As shown in Figs. 6 and 7, the rails $a$ are connected at the upper end to rails $a^3$, which form the return-grooves $a^4$ $a^5$, in which travel the wheels of the step-sections on their return. Two of the rails $a$ are connected to two of the rails $a^3$ at the base, while the other rails are discontinued, although in some instances they may be made continuous. These rails are made in the present instance of angle-bars properly curved at the top and bottom.

In my preferred structure no part of the floor or platform at the base or top of the stairway is formed of step-sections; but the development of steps commences with the emergence of the step-sections from beneath a permanent floor or platform at one end of the stairway, and as the other end of the stairway is approached the steps gradually decrease in height, so as to carry the passenger to a level only slightly above that of the permanent floor or platform onto which he is to pass from the stairway.

I preferably arrange the floor or platform C at the receiving end of the stairway above the lower terminal of the latter, so that a person stepping onto the moving stairway will step down, thus transferring his weight onto the foot on the step-section, and I prefer to arrange the floor or platform C' at the delivery end of the stairway, below the upper terminal thereof, so that a person stepping from the stairway to the floor will step down, thus transferring his weight onto the foot on the floor. By this arrangement danger of accident is materially lessened, as the passenger is not so liable to stumble as he would be were his weight distributed, so as to be partly on one and partly on the other foot at the moment of passing on or off the traveling steps.

By making the steps gradually increase in height the moment a person steps from the permanent platform at the receiving end onto a moving step-section he is carried upward or downward, according to the direction of travel of the stairway, while at the same time this upward or downward motion is so gradual that time and opportunity are afforded him to acquire a firm footing and stable equilibrium before the step assumes its full height. Thus the person carried thereby is not so liable to fall as if he were required to step from a fixed platform directly onto a suddenly-developed moving step of the full height or were suddenly transferred from a moving horizontal platform directly onto a moving step of full height, and as the step nears the platform at the delivery end, either in ascending or descending, the passenger can step from the moving step-section onto the platform without jar or danger, because there is such slight difference of level.

In order to prevent accidents at the terminal of the stairway, I continue the guides and the travel of the step-sections upward a considerable distance above the platform or floor at the said end, as shown in Figs. 1, 2, and 7. The step-sections thus act as an abutment, rendering impossible accidents in passing from the stairway to the floor or platform or by reason of the user being carried forward too far, said floor or platform in this case extending along one or both sides of the stairway, as shown in said figures of the drawings. Another advantage arising from this construction is that it enables me to employ roughened tread-surfaces for the step-sections, which cannot well be done where said sections disappear at the delivery end beneath a permanent floor or a platform.

The several step-sections are made independent and are self-contained and are preferably made separate in the form shown in Figs. 9, 10, and 11.

The step-sections of the stairway are driven in the present instance from the base.

D is a shaft driven in any suitable manner, so that it will turn slowly and evenly, and on this shaft are two pushing-wheels D', having socketed arms $d$, which engage rollers or pins on the step-sections. In the present instance I have shown rollers $b^3$, mounted on studs $b^4$, secured to the step-sections.

The wheels D' engage the rollers of the step-sections and carry them around the curve at the base, as in Fig. 6, and push them forward. Thus said wheels D' act directly upon each step-section successively to push it forward, and as each step-section is thus pushed it acts to push forward all the preceding step-sections of the series, contiguous step-sections throughout the series being when the device is in operation in positive contact with each other, and thus objectionable gaps in the structure are avoided. The step-sections return by their own weight to the starting-point or may be pushed there.

The upper wheels $b'$ of the step-sections are carried by studs $b^5$, which in the present instance also carry antifriction-rollers $e$, these rollers extending beyond the edge of the step-sections to which they are attached and bearing upon the risers of the next step-section in advance, as shown in Fig. 12. The lower wheels $b^2$ are mounted on studs $b^6$, having their bearings in extensions of the risers of the step-sections.

As shown in Figs. 3 and 4, I prefer to make the platform at the receiving end inclined toward the stairway and at a proper distance above it at the receiving-point and to cover the inclined surface with rubber or other suitable material, and, as shown in Figs. 3 and 5, I prefer to make the platform at the delivery end incline from the stairway and below it at the delivery-point and also cover this surface with rubber, and, as shown in Fig. 12, I may insert rubber or equivalent material in the treads of the step-sections.

The foregoing description refers particularly to an ascending moving stairway. If the direction of movement is to be reversed, as indicated in Fig. 24, so as to form a descending stairway, then the driving-shaft and its wheels are preferably placed at the summit and the moving abutment of step-sections formed at the base of the stairway.

It will be noticed on referring to Figs. 1 and 8 that the ends of the step-sections fit snugly between the sides of the stairway, so that the entire passage-way is to all intents and purposes the same as a stairway having fixed steps.

In some cases I may make lower and upper traveling platforms of the step-sections, as in the diagram Fig. 25, and I may make these traveling platforms on a level with a floor.

When three or more floors or stages are to be provided for, I prefer the form of device shown in the diagram, Fig. 26. In this case the intermediate floor or stage is on two levels $x$ $y$, the level $y$ on one side of the stairway being slightly below the delivery-level of flight of the stairway, so that a passenger carried by said flight can step down therefrom onto said floor or stage, while the level $x$ on the other side of the stairway is slightly above the receiving-level of flight 2 thereof, so that a passenger may step down from said floor or stage onto one of the traveling steps of said flight 2.

If desired, additional driving mechanism may be arranged at each floor or platform.

In order to take up lost motion, I preferably make the upper section A′, Figs. 7 and 7[a], adjustable. In the present instance the section A′ rests upon longitudinal beams, and on the section are lugs through which pass adjusting-screws $f$, which bear against lugs on the beams, so that on turning the screws in one direction the section is moved to take up the lost motion. The section $A^2$ may be secured to the side plates A of the stairway after adjustment by bolt $f'$.

In some instances I may make the stairway as shown in Figs. 13 to 18, inclusive, in which the step-sections pass directly under a platform at both the base and the summit. In this case I extend the shaft or stud of the upper rollers across the step-sections and provide a pushing-wheel $D^2$ with socketed arms which engage with the shaft or stud and will push the step-section forward. This step-section in turn will push the one in advance, and so on throughout the entire length of the stairway, and in order to carry the step-sections around the curve I mount on the shaft D wheels $D^3$, having projections which engage with the lower wheel or roller $b^2$ of the step-section, so as to steady them in passing around the curve. The guides for the step-sections (shown in Fig. 14) do not extend above the platform at the summit, but simply pass around and under the ascending flight of steps. The return section $A^2$ may be adjusted longitudinally to take up lost motion in the same manner as the device shown in Fig. 7. It will be noticed in these figures that the side walls or wainscoting $a^3$, Figs. 15 and 17, can be arranged close to the moving step-sections, so that no objectionable spaces are formed at the ends of the steps.

In Figs. 19, 20, and 21 I have shown step-sections which are driven by wheels $D^4$ on the driving-shaft D. These wheels act upon studs or pins $b^7$, projecting from the ends of the step-sections. In this case the step-sections may be solid, as shown in Fig. 21. The studs or rollers of the step-sections, Fig. 20, are adapted to a single channel $a^4$ at each side, and at each end of the stairway are short rails $a^5$, which carry the upper pins, so as to steady the step-sections when at the top and bottom of the flight. I provide guard-rails $a^6$ at the point where the two grooves merge into one groove, so as to carry the step-sections across the open spaces. The steps may return in any suitable manner, preferably in the channels shown. The step-sections do not extend above the floor-level at the summit, and the floors are slightly above the step-sections, and in this case I have so arranged the guideways that the step-sections form the upper and lower platforms, the tops of the steps being on the same level, although this is not essential.

In Fig. 22 I have shown the step-sections driven by an endless chain having lugs which act upon studs or rollers on the step-sections, so that two or more steps may be driven forward in unison. This construction may be used when it is required to push a considerable number of steps forward from a single point.

In Fig. 23 I have shown a construction which may be used in some instances where it is desired to dispense with guide-grooves for the return of the step-sections. In this instance I connect the step-sections by loose sliding joints consisting of a vertically-grooved plate *s*, in which slides a pin *s'*, so that while the steps have an independent up-and-down motion they are not separate, being connected together loosely by said devices. Thus while the steps will be in contact when they are pushed forward, preventing objectionable gaps or spaces, they will yet hang together on their return and may be simply suspended without guides. I prefer in this case, however, in order to guard against accidents should the step-sections become disconnected to use a single guide, which may carry the pins *s'* or either one of the rollers $b'$ $b^2$. Other forms of loose connections for the step-sections may be used without departing from the essential feature of the invention.

It will be understood that the devices shown in either of the figures may be used to ascend or descend; but I prefer to make separate structures ascending and descending.

In Fig. 27 I have shown a diagram of an overhead return for the step-sections. The sections in this instance extend up at each end of the stairway, forming the moving abutments, and extend over the stairway, so that the steps may be moved in either direction, one vertical run being the moving abutment in one case at the delivery end and the other vertical run being the moving abutment in the other case for the delivery end, so that in this modification the steps can be moved in either direction to act as an ascending or descending moving stairway, retaining in both cases the advantage of a moving abutment at the terminal of the stairway.

I claim as my invention—

1. In a moving stairway, step-sections free to slide upon each other, substantially as described.

2. The combination in a stairway, of a series of moving step-sections abutting one against another throughout the length of the stairway, guides for the sections, and means for moving the sections, substantially as described.

3. The combination in a stairway, of a series of moving step-sections abutting one against another and fitting against the side walls of a guideway, guides for the sections, and means for pushing the sections, substantially as described.

4. The combination in a stairway, of a series of independent moving steps, guides for the said steps, and means for pushing the series of steps from a fixed point, substantially as described.

5. The combination in a moving stairway, of moving step-sections, guideways at each side of the stairway, wheels on the step-sections adapted to travel on said guideways, and mechanism situated at one end of the stairway and operating to push the step-sections, substantially as described.

6. The combination in a moving stairway, of independent step-sections, two guideways therefor, and projections on each step-section, one adapted to one guideway and the other adapted to the other guideway, said guideways being so arranged in respect to each other and of such a curve that the step-sections will gradually increase in height as they move away from one platform and will gradually diminish in height as they approach the other platform, substantially as described.

7. The combination in a moving stairway, of sections independently movable to form steps or platforms, guides therefor, each step-section having projections adapted to the guides, a driving-shaft, and wheels on the driving-shaft adapted to engage the step-sections, substantially as described.

8. The combination in a stairway, of moving step-sections, with a platform situated on a level sightly below the tread of the step-sections at delivery-point, substantially as set forth.

9. The combination in a stairway, of moving step-sections, a platform situated on a level slightly above the tread of the step-sections at receiving-point, and a platform situated on a level slightly below the tread of the step-sections at the delivery-point, substantially as described.

10. The combination in a moving stairway, of traveling step-sections, and a floor or platform at the delivery end thereof, the travel of the step-sections being continued above said floor or platform so as to form an abutment, substantially as described.

11. The combination in a moving stairway, of traveling step-sections, with guides for said sections, guides extending upward beyond a floor or platform at the delivery end of said stairway, so that the step-sections will be carried to a point above said platform and act as an abutment, substantially as described.

12. The combination in a moving stairway, of a floor or platform at each end of the stairway, independent step-sections, means for moving the said sections, and guides for the said sections, said guides being so formed that the steps will gradually increase in height as they move away from one platform and will gradually decrease in height as they approach the other platform, the platform at the receiving end being above the level of the step-sections and the platform at the delivery end being below the level of the step-sections, and the guides for the step-sections extending considerably above the platform at the delivery end so that the step-sections will pass upward and form an abutment, all substantially as described.

13. In a moving stairway, the combination of separate step-sections, guides therefor, and means for pushing the step-sections forward, substantially as described.

14. In a moving stairway, the combination of a series of disconnected step-sections, and guides therefor, with means for engaging and moving said step-sections successively and thereby imparting motion to the series, substantially as described.

15. The combination in a moving stairway, of step-sections free to slide upon each other, guides therefor, the guides at one end being adjustable for the purpose of taking up lost motion, substantially as described.

16. A moving platform or stairway consisting of sections, inclined guides therefor, and means for positively moving the sections forwardly along the inclined guides at a given speed by causing them to push one upon another.

17. A moving carrier guided so as to form a platform, the direction of travel of the said carrier being abruptly changed at said platform so as to serve as an abutment, substantially as described.

18. A moving carrier guided so as to form a platform, the direction of travel of said carrier being abruptly changed at said platform so as to serve as an abutment above the platform, in combination with one or more fixed platforms adjoining that of the moving carrier, substantially as described.

19. A moving carrier consisting of a series of sections guided so as to form a platform, the direction of travel of the said sections being abruptly changed at said platform so as to form an abutment, substantially as described.

In testimony whereof I have signed my name to this specification in the presence of two subscribing witnesses.

JAMES M. DODGE.

Witnesses:

CHARLES H. HOWSON,
JOS. H. KLEIN.